Oct. 1, 1929.  W. V. D. KELLEY ET AL  1,729,617
STEREOSCOPIC PICTURE
Filed July 24, 1924    3 Sheets-Sheet 1
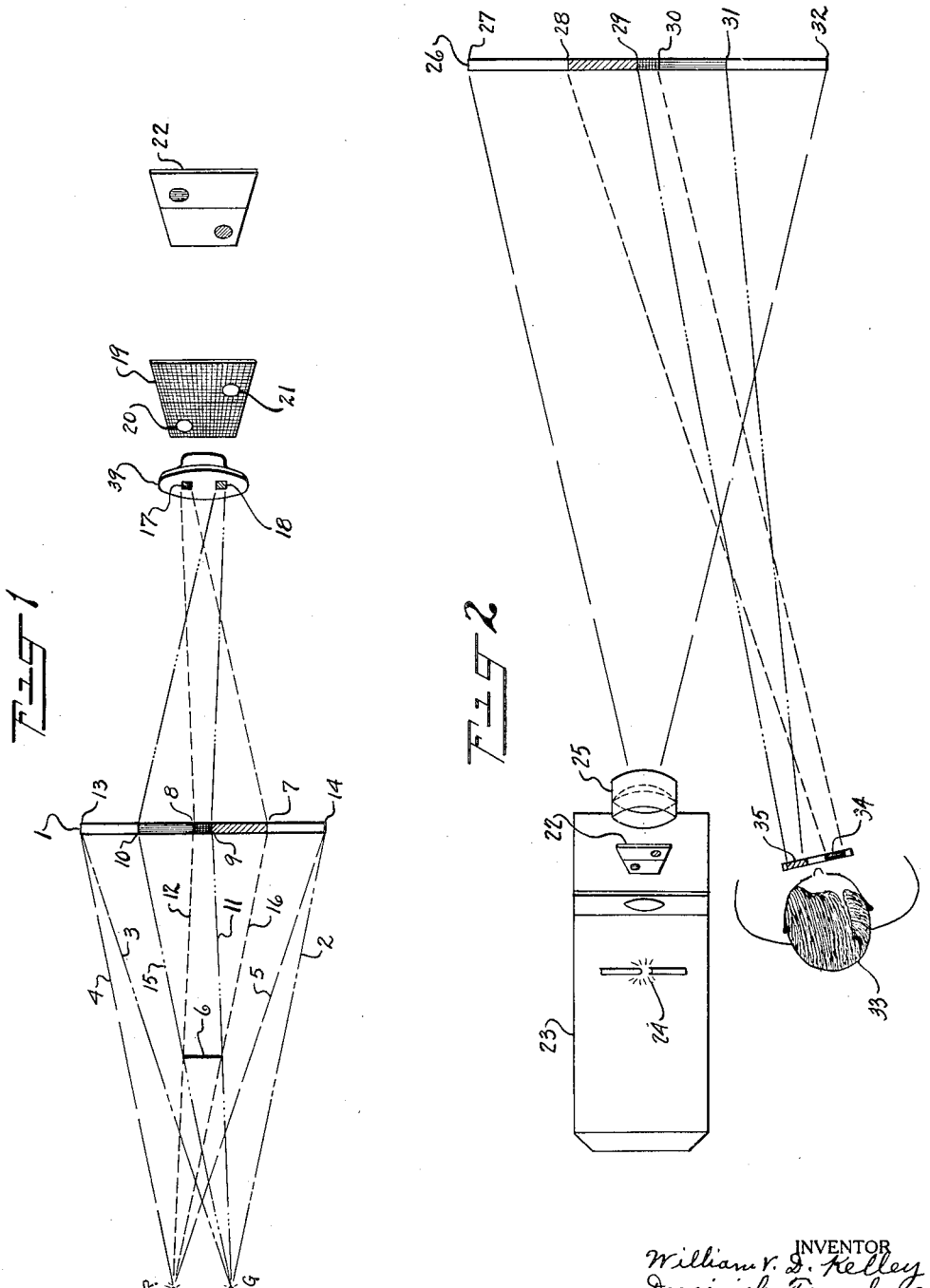

Oct. 1, 1929.                W. V. D. KELLEY ET AL                1,729,617
                              STEREOSCOPIC PICTURE
                             Filed July 24, 1924           3 Sheets-Sheet 2
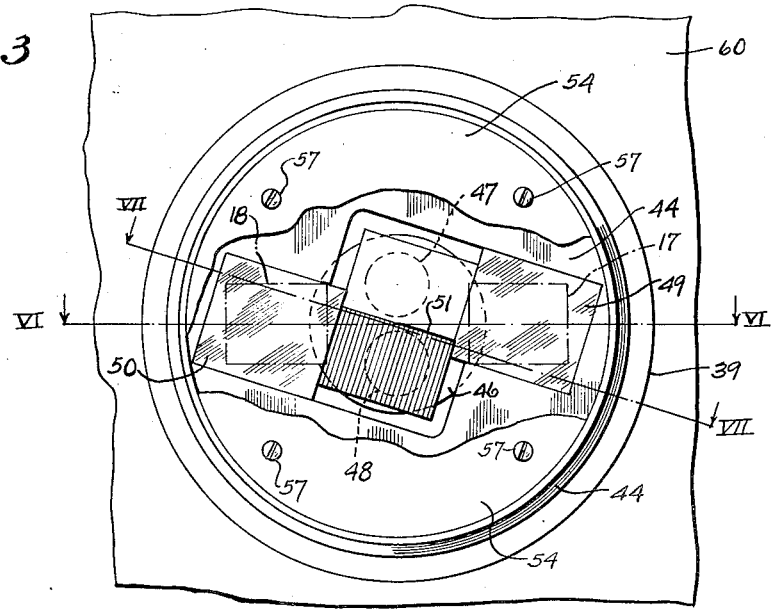
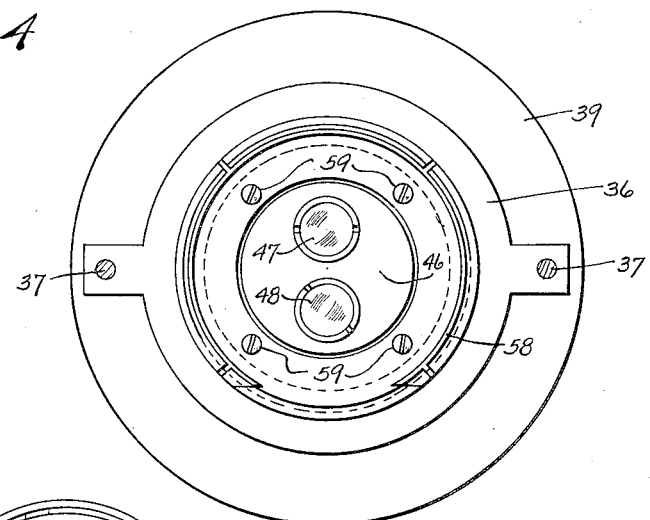
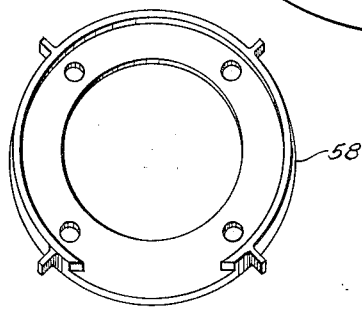
INVENTORS
William V. D. Kelley
Dominick Tronolone
BY
Lyman E. Dodge
ATTORNEY Oct. 1, 1929.  W. V. D. KELLEY ET AL  1,729,617
STEREOSCOPIC PICTURE
Filed July 24, 1924   3 Sheets-Sheet 3
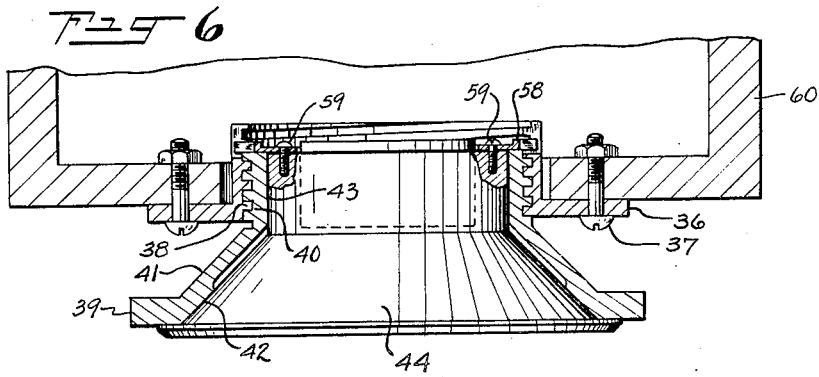
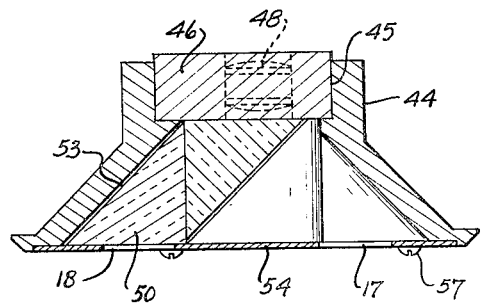
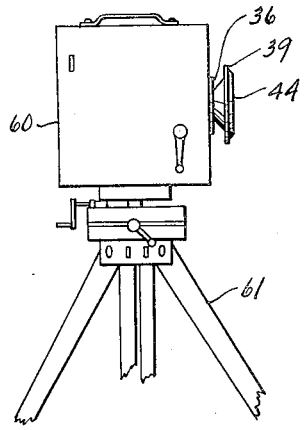
INVENTORS
William V. D. Kelley
Dominick Tronolone
BY
Lyman E. Dodge
ATTORNEY Patented Oct. 1, 1929

1,729,617

UNITED STATES PATENT OFFICE

WILLIAM V. D KELLEY, OF JERSEY CITY, AND DOMINICK TRONOLONE, OF FORT LEE, NEW JERSEY, ASSIGNORS TO KELLEY COLOR LABORATORY, INC., OF PALISADE, NEW JERSEY, A CORPORATION OF NEW JERSEY

STEREOSCOPIC PICTURE

Application filed July 24, 1924. Serial No. 727,894.

This invention relates to photography particularly to motion picture photography and more especially to stereoscopic motion picture photography.

The principal object of this invention is to provide a means and method of exhibiting to an observer a simulation of motion as an image, on a screen which will produce a stereoscopic effect when properly viewed.

A further object of the invention is the production of a camera which is adapted to receive light rays from an object through two orifices spaced apart in a horizontal plane, a distance corresponding somewhat to the interpupillary interval of the average human eyes and to then operatively direct those rays through two lenses spaced apart in a vertical plane a distance corresponding to the distance between the centers of two adjacent image spaces of the ordinary motion picture film.

A further object of the invention is a camera of the type specified which will produce an image in one picture space displaced to the left as regards the longitudinal center line of the film and an image of the same subject simultaneously formed in an adjacent picture space displaced to the right as regards the longitudinal center line of the film.

A further object of the invention is the provision of color means for differentiating the image formed to the left from that formed to the right of the longitudinal center line of the film.

A further object of the invention is the provision of means involving colored viewing mediums, whereby one image only will be seen by one eye of an observer and the other image only will be seen by the other eye when the properly colored images are projected on a viewing screen or surface.

Other objects and advantages will appear as the description of a particular physical embodiment of our invention, selected to illustrate the same, hereinafter appears and as a description of our method expands, and the novel features will be pointed out in the appended claim.

In describing the invention in detail and the particular physical embodiment selected to illustrate the invention, reference is had to the accompanying drawing, wherein we have illustrated a particular preferred physical embodiment of our invention, and wherein like characters of reference designate corresponding parts throughout the several views and in which:

Figure 1 is a schematic view illustrating an arrangement and means for producing a film for projection in accordance with our invention; Fig. 2, is a schematic view illustrating the projection and viewing of an image in accordance with our invention; Fig. 3, is a front view of a camera lens and prisms mount employed to produce the results of our invention; Fig. 4, is a rear view of the device as shown by Fig. 3; Fig. 5, is a detail perspective view of a part of the lens and prisms mount, Fig. 3; Fig. 6, is a cross sectional view of the plane indicated by the line VI—VI of Fig. 3, viewed in the direction of the arrows at the ends of the line; Fig. 7 is a cross-sectional view on the plane indicated by the line VII—VII of Fig. 3, viewed in the direction of the arrow; Fig. 8, is a schematic view illustrating the attachment of our lens and prisms mount Fig. 3 to a camera.

In Fig. 1, applicants have illustrated a source of red light R and a source of blue-green light B G. These lights may be obtained in any of the usual and ordinary and well known manners, either by the use of one light generator and differently colored filters or by two light generators and suitable filters. However obtained the lights are complementary and so arranged that each completely illuminates a screen 1, if no object is interposed between the lights and the screen, as indicated by lines 2—3 and 4—4. The lights are separated about three inches in practice, but varies according to the size of screen used.

The screen 1 may be of any suitable or appropriate properly translucent material, such as ground glass or tracing cloth, to the end that illuminated images formed on the back thereof, that is the side toward the lights, may be properly photographed by suitable camera positioned at some suitable distance in front of the screen.

In the practice of our invention we form images of desired still or moving objects on the screen 1 by positioning the object or objects between the lights and the screen. In Fig. 1, we have for the purposes of illustration shown an object 6 so positioned. It will readily be seen that object 6 will cast a shadow on screen 1, by reason of light R, extending from point 7 to point 8. It will also be seen that object 6 will cast a shadow on screen 1, due to light B G extending from point 9 to point 10. These shadows overlap from 8 to 9 and by following lines 11 and 12 it will be seen that light from neither source reaches the section 8 to 9 of the screen so that this section as viewed from the front will appear black.

It is obvious that both sections 10 to 13 and 7 to 14 of the screen 1 will appear illuminated but as though illuminated by so-called white light. These sections are both illuminated by light from both sources, as will be seen by following the ray lines of Fig. 1. Section 10 to 13 is illuminated by red light because at least included in the angle made by lines 4 and 12. It is illuminated by blue-green light because included in the angle made by lines 3 and 15. Section 7 to 14 is included in the angle made by lines 5 and 16 and so illuminated by red light. It is also at least included in the angle between lines 2 and 11 and so is illuminated by blue green light. The illumination of sections 10 to 13 and 7 to 14 must be as though by white light because produced by a combination of complementary colored lights, as red and blue-green.

Sections 7 to 9 and 8 to 10 are not absolutely black as in section 8 to 9, nor are they illuminated by white lights as are sections 7 to 14 and 10 to 13. Section 7 to 9 is not illuminated by light from source R as hereinbefore pointed out, but it is illuminated by light from source B G as will be seen by following lines 2 and 11. Section 8 to 10 is not illuminated by light from source B G as hereinbefore pointed out, but it is illuminated by light from source R as will be seen by following lines 4 and 12.

The result of the arrangement as hereinbefore described is that an observer, in front of screen 1, will see: two sections, 7 to 14 and 10 to 13 illuminated by white light; one section, 8 to 9 dark; section 8 to 10 appearing as the form of object 6, less such amount as appears in section 8 to 9, illuminated by red light, and section 7 to 9 appearing as the form of the object 6, less such amount as appears in section 8 to 9, illuminated by blue-green light.

As we desire to make a permanent record of the results obtained on screen 1, the screen is photographed. In order to do this we prefer to proceed in a special manner. 39 is a lens and prisms mount to be hereinafter fully and particularly described. For present purposes it is sufficient to explain that this lens and prisms mount has two stop openings 17 and 18, the centers of which are horizontally displaced substantially corresponding to the interpupillary distance of the average human eye. Stop opening 17 is covered with a red filter and stop opening 18 with the complementary colored filter blue-green. Assuming that 39 is a lens and prism mount and that 19 is a fragment of motion picture negative film placed in the camera of which 39 is the lens and prisms mount, then upon exposure latent images will be formed on film 19. The images which will be formed by light passing through opening 17 will be, when developed clear in that portion of the film corresponding to section 7 to 8 of the screen. The section 8 to 9 is black on the screen and so would naturally form a clear image, when developed, on film 19. Section 7 to 9 is illuminated by blue-green light which is cut off by filter over stop opening 17, so that the image of section 7 to 8 of the screen will appear on the film when developed as clear. In the same way the image of section 9 to 10 will be clear as the red light from section 8 to 10 is cut off by the blue-green filter in passing through stop opening 18.

Light from section 8 to 13 and from section 7 to 14 passing through the red filter over stop opening will appear on the film as black, when developed, because those sections are illuminated either by white light or by red light. Light from sections 10 to 13 and 9 to 14, passing through the blue green filter over stop opening 18 will appear as black, when developed, because those sections are illuminated either by white light or blue-green light.

The net result of photographing in the manner set forth is to produce a film which when developed will have two images thereon, shown by clear spaces, one image being that of section 9 to 10 and the other of section 7 to 8.

As will be described hereinafter more in detail the lens and prisms mount 39 is so constructed that the light entering stop opening 17 is received on one image space of the film and the image of sections 7 to 8 is formed substantially to the right of the longitudinal median line of the film. The light entering stop opening 18 is received on an adjacent image space of the film and the image of section 9 to 10 is formed substantially to the left of the longtiudinal median line of the film. The image of section 7 to 8 would therefore be formed at 20 and the image of section 9 to 10 in the adjacent image space 21. It will be also obvious that as the images are formed in adjacent image spaces the film must be advanced two image spaces for each exposure.

After the negative has been obtained and developed, a positive is made therefrom and the image resulting from light passing through the red filter will be colored blue-green and the image made by the light passing through the blue-green filter will be colored red. This may be done in any of the approved or well known methods. The resulting positive will appear as shown by 22, the images being reversed in position on the film.

In Fig. 2 we have illustrated an arrangement, schematically for exhibiting the positive film. 23 designates the projection machine of any usual or well known type. The film 22 has light from source 24 pass therethrough and then through lens 25. The result on the screen will be an exact duplicate of that shown on screen 1. On screen 26, sections 27 to 28 and 31 to 32 will appear white; section 29 to 30 black; section 28 to 29 blue-green, and section 30 to 31 red.

The screen 26 is viewed by an observer 33, provided with a viewing medium which presents a red filter to his right eye and a blue-green filter to his left eye. The object will appear as an image in stereoscopic relief. The right eye of the observer will see only section 28 to 30, because section 30 to 31 being red will not appear dark. The left eye will see only section 29 to 31, because the section 28 to 29 being blue-green will not appear dark.

As the complementary colored picture appear on adjacent image areas it will be necessary to increase the rate of movement of the film so that approximately thirty-two pictures per minute are exhibited.

In order to have stop openings spaced apart in a horizontal line and still have the images formed one over the other in substantially a vertical line it has been necessary to devise an apparatus as shown in elevation in Fig. 3, designated a prism and lens mount. This mount as shown best by Fig. 6, includes a camera attaching ring 36, which may be attached as by bolts, as 37, to a camera body. This ring is internally threaded as shown at 38, and into this screws the lens and prisms carrying body holder 39. This holder 39, is cylindrical for a distance 40 and then flares outwardly as at 41. The body 39 is merely a shell, the inside surfaces being indicated at 42 and 43. The body 39 has positioned therein the lens and prisms carrying body proper 44.

The body 44 conforms in outward shape to the internal shape of the holder 39, and is apertured, at 45 to receive the lens barrel 46, carrying lens combination 47 and 48. The body 44 is also excavated to receive two prisms 49 and 50. These two prisms abut along line 51, Fig. 3 and are both shaped as shown by 50 in Fig. 7. They are placed at an angle to the transverse line VI—VI of Fig. 3 so that the face of one is in front of lens combination 47, that is prism 49 is in front of lens 47, and prism 50 is in front of lens 48. The prisms are in effect parallelopipedons having as shown by 50, one face silvered and a parallel face as 53 also silvered.

The prisms 49 and 50 are retained in place and stop openings therefor are formed by plate 54, having openings 17 and 18. The centers of these openings are about inter-pupillary distance apart as hereinbefore stated. The plate 54 is secured to the prism body 44 by screws as 57.

The lens and prisms body proper, 44, is secured in holder 39 by annulus 58, attached by screws, as 59, passing therethrough and into the body 44, the annulus also bearing on holder 39.

From the construction of the lens and prisms mount it will be seen that light entering opening 18 will pass into prisms 50, being reflected at surface 53 to surface 52 where it is again reflected and then passes into lens combination 48. In the same way light entering opening 17 passes into lens combination 47. The light passing through lens combination 47 forms the upper of the two images as shown by film 19 and the light passing through lens combination 48 forms the lower of the two images on film 19, Fig. 1.

In Fig. 8 we have shown the attachment of the lens and prism mount to an ordinary motion picture camera, having body 60 and tripod 61.

In the practice of our method any suitable object, of which 6 is merely illustrative may be utilized. The process may be applied to living objects, so called animated cartoons or paper cut-outs by interposing them in a suitable manner between the lights R and B G and screen 1. If the effect of the objects leaving the screen and appearing over the observer is desired then the object, as 6, is brought nearer the lights. In fact very interesting and amusing effects may be obtained by moving the object, as 6, toward and away from the light sources during the photographing of the same.

Although we have described our preferred method of arranging the apparatus for producing the desired results, nevertheless it is desired to have it understood that we do not desire to exclude the making of negatives by the use of one or two light sources without filters. If two light sources are used, a shutter would be fitted to uncover the lamps alternately in my mechanism with its camera shutter. As the shadow representing the left eye is on the screen an exposure is made in the camera, the film is then covered and advanced and the shadow representing the right eye is thrown on the screen and another exposure then made. The film will then represent the left and right eye shadows alternately. We do not mean either to exclude the use of one light source moved the required distance from right to left or vice versa so as to produce the right and left shadows, with a camera synchronized as above pointed out.

The making of the positive films to obtain the desired result is a matter of some moment in order to obtain the best result. It is well known that to produce a perfect result on the projection screen it is necessary to have color edges that are totally eliminated by the colors in the filters of the viewing medium used. If the colors in the positives are produced by tones, they are not entirely satisfactory. Any dyeing method that produces any effect on the gelatine the nature of relief due to hardening action of the chemical baths used will be detrimental. In the present system only tints on the screen are seen. These are most easily controlled. These colors must be uniform throughout the reel of film. Obviously the easiest method for doing this would be by a color filter attached to the projector about the same as used in the well known Kinemacolor projector. The drawback of the latter matter is the danger of having color reversed, the necessity of a special projector and the interference with sharpness on the screen. In our process we take the positive film after it has been developed, fixed and washed and dye the entire frame of film in the blue-green color to the proper density, rinse and dry. We then coat the pictures taken through the right eye lens with a water proof varnish, such as Zapolin, which is a celluloid in solution and which dries quickly. We then replace the film on the racks and place in a wash tank until the dye has been washed out completely from the exposed areas, thus leaving every other image area colored blue-green. We then dip the film and reel in a red dye, wash and dry and we have a film evenly colored throughout its length having alternate image areas dyed blue-green and the other red.

Although we have particularly described the construction and mode of operation of one physical embodiment of our invention, and explained the operation and principle thereof, nevertheless, we desire to have it understood that the form of apparatus selected and the procedure followed is merely illustrative but does not exhaust the possible physical embodiments of the idea of means underlying our invention.

What we claim as new and desire to secure by Letters Patent of the United States, is:

The method of producing motion pictures in stereoscopic relief which consists in photographing the shadows of an object on a curtain, the shadows being overlapped colors from two light sources and each succeeding exposure on the strip representing the right and left views, making a contact print and coloring each area in alternating complementary colors so that when projected in rapid succession the sensation of an image in relief is given to the beholder wearing spectacles containing transparent colored substances complementary to the color edges of the projected picture.

WILLIAM V. D. KELLEY.
DOMINICK TRONOLONE.